Figure 4:
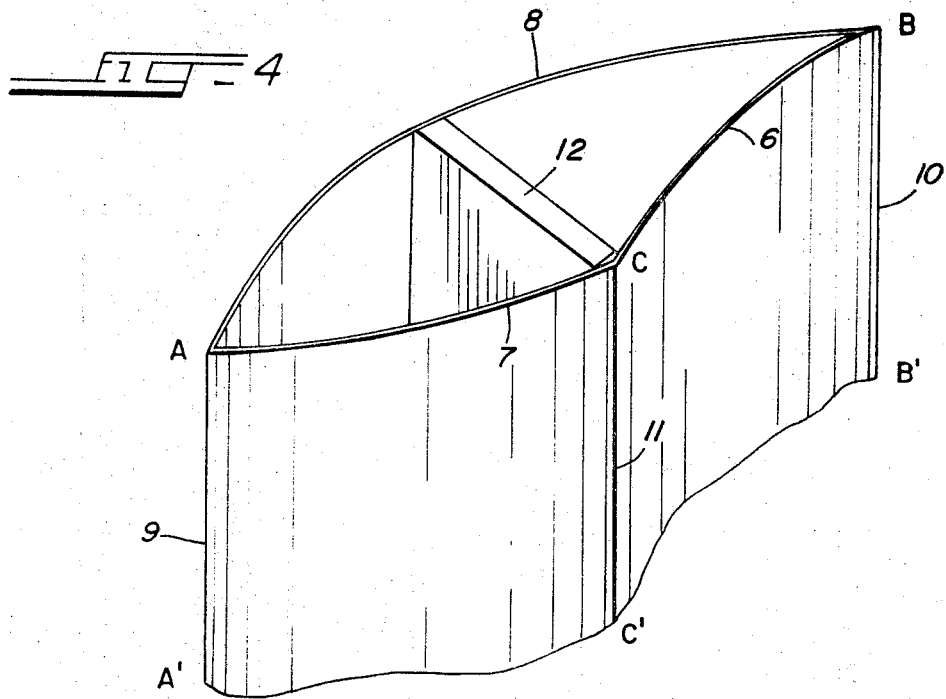

United States Patent

[11] 3,545,729

[72] Inventors Karl Wisseroth
Ludwigshafen;
Richard Scholl, Gruenstadt, Germany
[21] Appl. No. 783,608
[22] Filed Dec. 13, 1968
[45] Patented Dec. 8, 1970
[73] Assignee Badische Anilin & Soda-Fabrik
Aktiengesellschaft
Ludwigshafen (Rhine), Germany
[32] Priority Dec. 14, 1967
[33] Germany
[31] No. 1,557,042

[54] ANCHOR-AGITATOR
2 Claims, 5 Drawing Figs.
[52] U.S. Cl. .................................................. 259/182,
259/107
[51] Int. Cl. .................................................. B01f 7/16
[50] Field of Search .................................... 259/182, 178, (K)10, (K)5, (Dough Mixers (vert)), (Ice Cream Mixers (vert)), (Rubber Mixers), 7, 8, 23, 24, 43, 44, 107, 108; 107/38

[56] References Cited
UNITED STATES PATENTS
702,881 6/1902 Otis .............................. 259/178
978,372 12/1910 Hayne et al. ................. 259/108
3,195,869 7/1965 Paine ............................ 259/182

*Primary Examiner*—William I. Price
*Attorney*—Johnston, Root, O'Keeffe, Keil, Thompson & Shurtleff ABSTRACT: A two-armed anchor agitator for mixing pulverulent material in a stirred vessel, whose arms are rotatable about the center line of the vessel and are disposed parallel to, and at different distances from, the center line, the outer arm being longer and closer to the bottom of the vessel than the inner arm and both arms having a streamlined cross section.

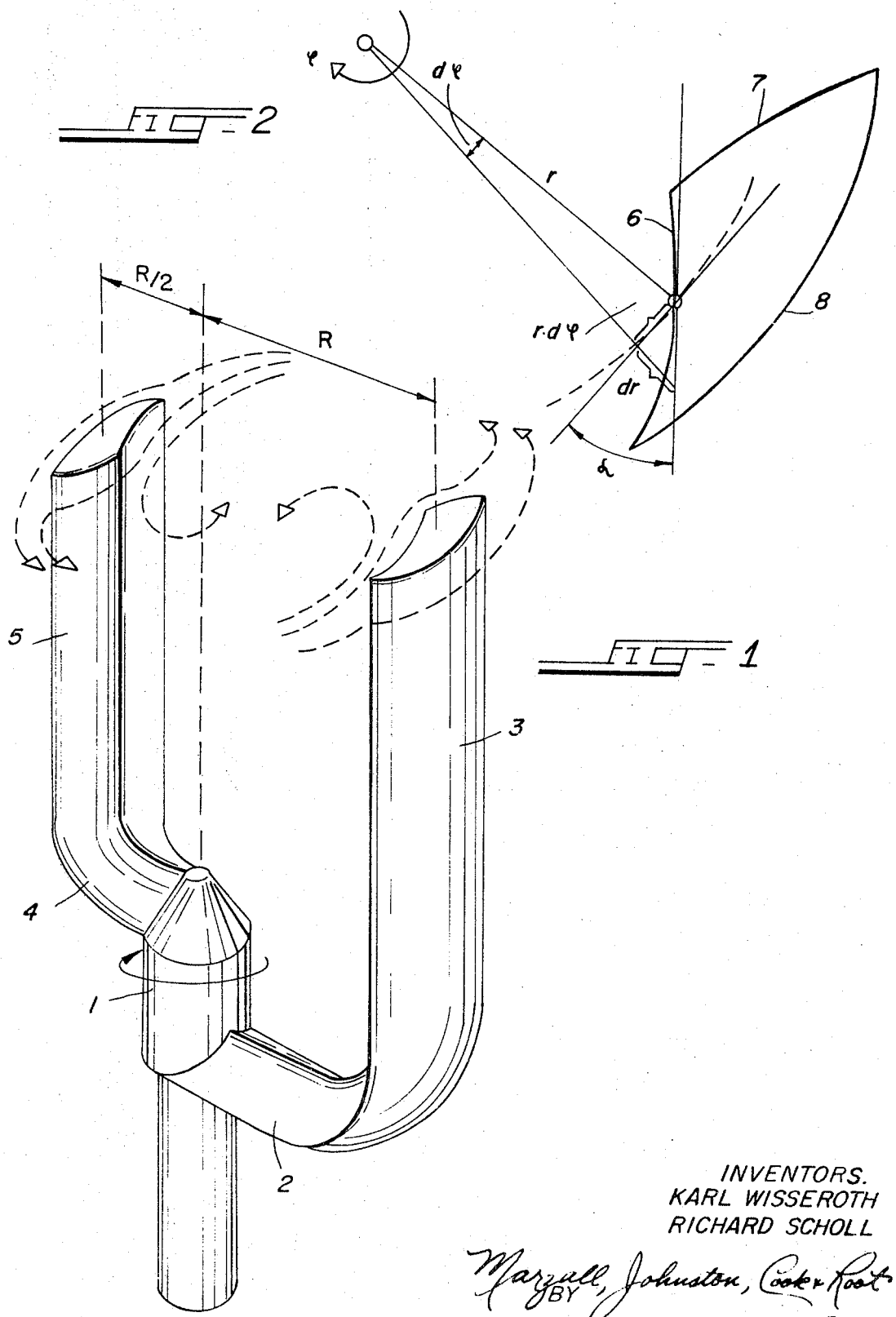

INVENTORS.
KARL WISSEROTH
RICHARD SCHOLL

ANCHOR-AGITATOR

The invention relates to an anchor agitator with two arms for stirred vessels.

For dissolving solids in liquids as well as for mixing substances of different kinds, stirred vessels equipped with a motor-driven stirrer are normally used. According to the nature of the contemplated process such stirrers may have varying shapes, the stirring element having for example the form of say a blade, a beam, a finger, a crossbeam or anchor. It is a shortcoming of all these forms of stirrer that, particularly when stirring pulverulent materials, a completely uniform mixture of all the contents of the vessel cannot be achieved. Some portions of the contents tend to be more intimately mixed than others.

Very thorough and careful mixing is needed in the polymerization of an olefin, such as ethylene, in the gas phase. In this process it is essential that the pulverulent polymer should be very uniformly mixed with the gaseous monomer in order to achieve a uniform temperature, i.e. thermal homogeneity, throughout the contents of the reactor and also in order to stir the normally solid catalysts quickly and evenly into the mixture. In the majority of cases mechanical devices are used for this purpose, such as stirrers which have blades resembling the flukes of an anchor.

Owing to the high friction between the stirrer and the powder bed, high static charges generally build up and these will then cause layers of the polymer powder to stick firmly to the stirrer surface. As polymerization proceeds, these powder layers which stick to the stirrer may fuse together to form coherent crusts, and when these are eventually broken away and detached by the stirrer vibrations they form lumps in the bed of polymer powder.

It is the object of the present invention to provide an anchor agitator for mixing pulverulent materials in a stirred vessel, so designed that the above-described difficulties do not arise and that the mixing effect is substantially uniform throughout the contents of the stirred vessel. Moreover, the stirrer should not retain unmixed components on any part of its surface during the process of mixing.

The object is achieved in accordance with this invention by a two-armed anchor agitator whose arms are disposed parallel to the center line of the vessel at different distances from the center line, the outer arm being longer and closer to the bottom of the vessel than the inner arm and both arms having a streamlined cross section externally defined by arcs of a circle or of logarithmic spiral.

In a specific embodiment of the proposed anchor agitator, the distance of the outer arm from the center line of the vessel may be twice that of the inner arm and the cross sections of the two arms are similar.

The asymmetrical arrangement of the arms generates a substantially uniform degree of agitation and mixing of the pulverulent contents of the stirred vessel. By suitably shaping the conveying surfaces, particularly by choosing the angle of pitch of these surfaces in relation to the direction of motion, the agitation and circulation of the material can be substantially intensified.

Furthermore, the development of electrostatically adhering layers is suppressed by the streamlined configuration of the agitator arm cross sections.

Figure 5:
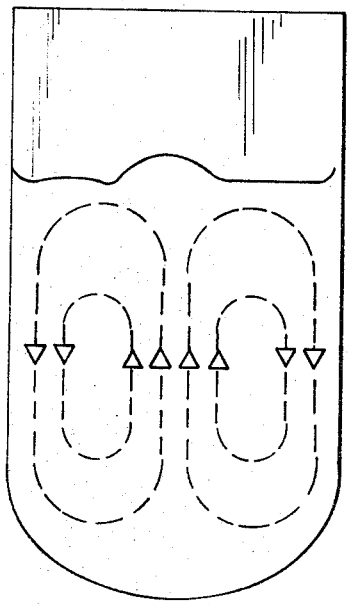
Figure 3:
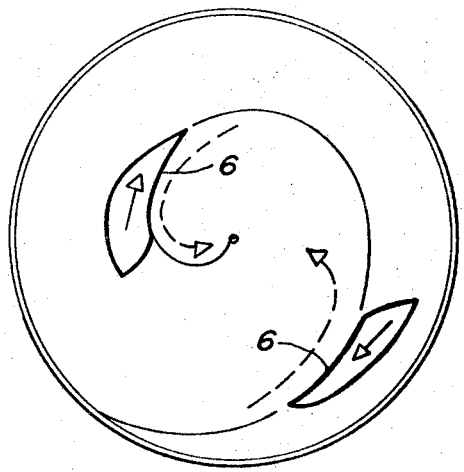

An embodiment of an agitator according to this invention is shown by way of example in the drawings in which FIG. 1 is a perspective view of an agitator according to the invention, FIGS. 2 and 3 are cross sections of the agitator arms showing the geometrical relationships and the flow pattern in the stirred material respectively, FIG. 4 is a perspective view of the agitator in cross section, and FIG. 5 is a vertical section of a filled vessel indicating the flow pattern in the stirred material.

The agitator comprises a short vertical stub shaft 1 which is mounted in the center line of the vessel and which at its bottom end carries an outer arm and at its upper end an inner arm. The outer arm consists of a horizontal part 2 and a vertical part 3. Analogously the inner arm has a shorter horizontal part 4 and a shorter vertical part 5. The stub shaft 1 is advantageously mounted in the bottom of the vessel (FIG. 1).

Preferably the inner pushing faces 6 of the agitator have a concave shape and in order to maintain a constant push angle during the stirring process the cross sections of these faces are advantageously defined by arcs of a logarithmic spiral (FIG. 1). The relationship between the radial distance from the center and the central angle ** subtended by length of a differential surface of the agitator 6 will then be defined by $$r = r_0 \cdot e^{A \cdot \psi}$$

where $A$ is the tangent of the angle of pitch $\alpha$, viz $$A = \tan \alpha = \frac{dr}{r \cdot d\varphi}$$

as will be understood from Fig. 2.

FIG. 3 is a horizontal section of both agitator arms, which clearly shows that the cross sections of the inner pushing faces 6 are defined by arcs of a (logarithmic) spiral.

In special cases it is advantageous to check the final shape of the agitator according to the invention by testing a model, if possible by stroboscopic observation. In fact, the nature of the pulverulent material that is to be agitated as well as the speed of the agitator are significant factors for determining the length of the profile of the streamlined external casing of the agitator arms. The agitator may be of lightweight sheet metal construction based on the principle exemplified in FIG. 4. In this arrangement three thin sheet metal plates 6 to 8 are welded together at their adjoining edges 9, 10, and 11 and welded to a thicker gauge transverse support 12.

FIG. 5 is a vertical section of a reactor fitted with an asymmetrical agitator according to the invention. The flow pattern for this agitator is indicated diagrammatically. The volumetric circulation rate of such an agitator attains nearly the same values as those which can be achieved with a vertical helical stirrer.

The vertical circulation of the material can be quite easily made visible by using a cork as an indicator. For assessing the circulating capacity an even better way consists in measuring the time within which a powder bed to which for example a color substance has been added as an indicator becomes a completely uniform and homogeneous mixture. The circulating capacity is particularly high if the stirrer shaft is driven from underneath the bottom of the vessel as indicated in FIG. 1.

EXAMPLE

A stirred vessel 1.25 meters in diameter and 2.50 meters in height is fitted with an asymmetrical anchor agitator according to the invention. The distance from the bottom edge to the top edge of the pair of agitator arms is 165 cm. The length of the profile—represented by the distance A—B in FIG. 4—of each arm is 25 cm. Whereas the outer arm is relatively close to the wall and the bottom of the vessel, leaving a clearance of about 3 cm., the inner arm describes a circle whose radius (about 30 cm.) is half that of the vessel. The distance of the bottom edge of the inner arm from the reactor bottom is also about 30 cm.

This vessel is filled to a depth of about 1.50 meters with a fine-grained polyethylene powder having an average particle size of about 0.3 mm. Whilst blowing air through the powder bed at a velocity of about 0.3 cm./sec., with reference to the free internal cross section of the vessel, the power consumption of the agitator at 30 r.p.m. is about 15 kilowatts.

Probes which are evenly distributed both with respect to the radius and the height of the vessel are arranged inside the vessel. These permit samples to be taken during agitation. A small quantity of a pulverulent dye is deposited on the surface of the bed of material. By taking samples at intervals from the probes it is found that under the selected conditions a nearly homogeneous distribution in the entire contents of the vessel has been achieved in about 1 minute.

For the purpose of abstracting the heat of polymerization the observed period of 1 minute for achieving a homogeneous distribution is a satisfactory time. This was proved under polymerization conditions in an agitated vessel of comparable size.

We claim:

1. An anchor agitator having two arms for use in a stirring vessel, said arms being rotatable about the center line of said vessel, wherein the arms are disposed parallel to the center line of the vessel at different distances from the center line, the outer arm being longer and closer to the bottom of the vessel than the inner arm and both arms having a streamlined cross section externally defined by arcs of a circle or of a logarithmic spiral.

2. An anchor agitator according to claim 1, wherein the outer arm is spaced twice as far away from the center line of the vessel as the inner arm and the two arms have similar cross sections.

PO-1050
(5/69)

UNITED STATES PATENT OFFICE
CERTIFICATE OF CORRECTION

Patent No. 3,545,729                           Dated December 8, 1970

Inventor(s) Karl Wisseroth et al

It is certified that error appears in the above-identified patent and that said Letters Patent are hereby corrected as shown below:

Column 2, line 8, "**" should read -- $\varphi$ --.

Signed and sealed this 11th day of May 1971.

(SEAL)
Attest:

EDWARD M. FLETCHER, JR.          WILLIAM E. SCHUYLER, JR.
Attesting Officer                Commissioner of Patents